M. S. BURR.

NURSING-BOTTLE.

No. 6,809. Reissued Dec. 21, 1875.

WITNESSES.

W. L. Baynton

H. M. Anderson

INVENTOR.

Milo S. Burr

UNITED STATES PATENT OFFICE.

MILO S. BURR, OF BOSTON, MASSACHUSETTS.

IMPROVEMENT IN NURSING-BOTTLES.

Specification forming part of Letters Patent No. 68,285, dated August 27, 1867; reissue No. 6,809, dated December 21, 1875; application filed November 11, 1875.

*To all whom it may concern:*

Be it known that I, MILO S. BURR, of Boston, in the county of Suffolk and State of Massachusetts, have made certain new and useful Improvements in Nursing-Bottles; and I do hereby declare the following specification, taken in connection with the drawings, to be a full, clear, and exact description thereof.

Figure 1:
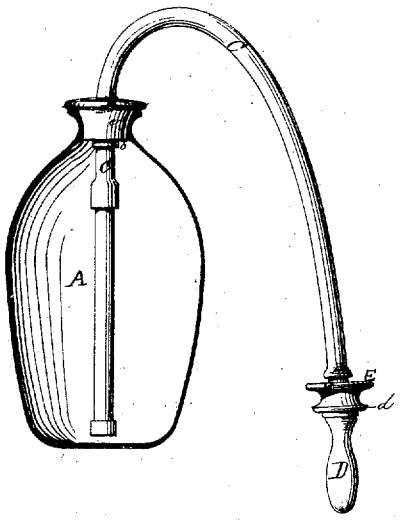
Figure 2:
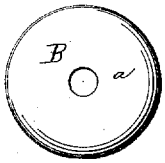
Figure 4:
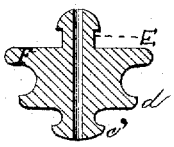
Figure 3:
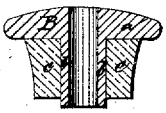
Figure 5:
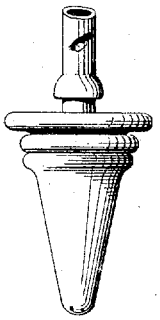

Figure 1 denotes a side elevation of a nursing-bottle provided with my invention or improvements. Fig. 2 is a top view of the bottle-stopper; Fig. 3, a vertical section of the same. Fig. 4 is a section of the combined mouth-guard and nipple and tube connector. Fig. 5 is a view of a portion of the elastic tube, the mouth-guard, and connector, with an ordinary nipple applied to its auxiliary shoulder.

In the drawings, A denotes an ordinary glass nursing-bottle, provided with a tubular stopper, B, and having a flexible india-rubber tube, C, extending up from the interior of the bottle or milk-reservoir, which, passing axially through a cylindrical hole made through the said stopper, is connected to one end of an annular flanged connection-piece, E. To the opposite end of the connection-piece E an india-rubber nipple, D, is affixed. F is the mouth-guard, combined with the nipple and tube connector, as hereinafter described.

The bottle-stopper is composed of a cap, *a*, of hard wood or other suitable material, having a hollow cylindrical shank, *b*, extending down through the cork, as shown at Fig. 3, and to this shank the cork is cemented or glued.

My improvement specially consists in the manner in which the mouth-guard, or shield for preventing the child from swallowing the nipple, is combined with a shoulder or shoulders, to which a nipple is to be attached, whereby the nipple can be removed for cleansing, and be replaced or a new one substituted with greater facility than heretofore, and without the necessity of readjusting the mouth-piece in position.

Before my invention the suction-tube C and the nipple D were connected by a cylindrical connection-piece of wood or other suitable material provided with an annular flange or shoulder at each end, for receiving and holding the end of the tube and the end of the nipple, respectively, and the mouth-piece was made in the form of an annular disk, which was slipped over the base of the nipple, and was required to be removed and replaced as often as the nipple was taken off and put on.

In my invention, F is a mouth-guard, the office of which is to rest against the lips, and to maintain the nipple in the proper position in a child's mouth. A shoulder, E, is attached to this guard, over which the end of the suction-tube C is to be drawn. In combination with the mouth-guard, but concentric with it, and placed so as to project from its front surface, I arrange one or more shoulders, *c′ d*, Fig. 4, for receiving and holding a nipple. One of these shoulders, *d*, I make of about double the diameter of the other, *c′*, in order to accommodate nipples of the different sizes and patterns shown, respectively, at Figs. 1 and 5. This arrangement admits of the mouth-guard, and the shoulders for the nipples, and the shoulders for the tube being made in one piece. It is apparent that from the location of the shoulders for the nipples in planes in front of the plane of the mouth-guard, constituting, in effect, an attachment of the shoulder to the guard, the nipple can be removed or replaced with much greater facility than could be done in case the mouth-guard was constructed in the form of an annular plate, and encircling the base of the nipple around the shoulder of the connecting-piece or coupling between the tube and the nipple. To the lower end of the flexible suction-tube C, or the part thereof which projects below the stopper B, I attach a glass tube, and dispose around its lower end a narrow annulus of rubber, the same being for the purpose of preventing breakage of the lower end of the glass tube by striking against the interior surface of the bottle. The diameter of the elastic tube C should be equal to or a little greater than that of the hole made through the stopper, in order that there may be a perfectly tight joint between the two. Furthermore, the said flexible tube should be so applied to the said stopper as to be capable of being moved up or down within the same, in order to adjust the end of the glass tube at a proper distance from the bottom of the bottle.

What I claim as my invention, and desire to secure by Letters Patent, is—

1. The combination of a mouth-guard and a shoulder for a nipple, the latter being located in a plane in front of the plane of the mouth-guard, and in continuation of the guard, substantially as described.

2. The combination of a mouth-guard, a shoulder for a suction-tube connection, and a shoulder for a nipple-connection, the latter located in a plane in front of the plane of the mouth-guard, and in continuation of the guard, substantially as described.

3. The combination of a mouth-guard, F, a shoulder, E, for a suction-tube, and shoulders *c' d*, for nipples of different sizes, located in planes in front of the plane of the mouth-guard, and in continuation of the guard, substantially as described.

MILO S. BUHR.

Witnesses:
W. L. BOYNTON,
H. M. ANDERSON.